US010761522B2

(12) United States Patent
Lu et al.

(10) Patent No.: US 10,761,522 B2
(45) Date of Patent: Sep. 1, 2020

(54) CLOSED-LOOP MODEL PARAMETER IDENTIFICATION TECHNIQUES FOR INDUSTRIAL MODEL-BASED PROCESS CONTROLLERS

(71) Applicant: Honeywell Limited, Mississauga (CA)

(72) Inventors: Qiugang Lu, Vancouver (CA); Lee D. Rippon, Comox (CA); R. Bhushan Gopaluni, Vancouver (CA); Michael G. Forbes, North Vancouver (CA); Philip D. Loewen, North Vancouver (CA); Johan U. Backstrom, North Vancouver (CA); Guy A. Dumont, Vancouver (CA)

(73) Assignee: Honeywell Limited, Mississauga (CA)

( * ) Notice: Subject to any disclaimer, the term of this patent is extended or adjusted under 35 U.S.C. 154(b) by 283 days.

(21) Appl. No.: 15/636,419

(22) Filed: Jun. 28, 2017

(65) Prior Publication Data

US 2018/0081348 A1 Mar. 22, 2018

Related U.S. Application Data

(60) Provisional application No. 62/395,904, filed on Sep. 16, 2016.

(51) Int. Cl.
*G05B 19/418* (2006.01)
*G05B 17/02* (2006.01)
*G05B 13/04* (2006.01)

(52) U.S. Cl.
CPC ....... *G05B 19/41885* (2013.01); *G05B 17/02* (2013.01); *G05B 2219/25298* (2013.01); *G05B 2219/39159* (2013.01)

(58) Field of Classification Search
CPC .............. G05B 19/41885; G05B 17/02; G05B 2219/25298; G05B 2219/39159
(Continued)

(56) References Cited

U.S. PATENT DOCUMENTS 5,351,184 A 9/1994 Lu et al.
5,561,599 A 10/1996 Lu
(Continued)

FOREIGN PATENT DOCUMENTS

WO 2008139006 A1 11/2008
WO 2010138452 A1 12/2010

OTHER PUBLICATIONS

Badwe, Abhijit, et al., "Detection of model-plant mismatch in MPC applications," Journal of Process Control, No. 19, 2009, pp. 1305-1313.
(Continued)

*Primary Examiner* — Jigneshkumar C Patel (57) ABSTRACT

A method includes obtaining closed-loop data associated with operation of an industrial process controller, where the industrial process controller is configured to control at least part of an industrial process using at least one model. The method also includes generating at least one noise model associated with the industrial process controller using at least some of the closed-loop data. The method further includes filtering the closed-loop data based on the at least one noise model. In addition, the method includes generating one or more model parameters for the industrial process controller using the filtered closed-loop data.

14 Claims, 3 Drawing Sheets

(58) Field of Classification Search
USPC .......................................................... 700/29
See application file for complete search history.

(56) References Cited

U.S. PATENT DOCUMENTS

| | | | |
|---|---|---|---|
| 5,572,420 | A | 11/1996 | Lu |
| 5,574,638 | A | 11/1996 | Lu |
| 5,758,047 | A | 5/1998 | Lu et al. |
| 6,055,483 | A | 4/2000 | Lu |
| 6,122,555 | A | 9/2000 | Lu |
| 6,253,113 | B1 | 6/2001 | Lu |
| 6,697,767 | B2 | 2/2004 | Wang et al. |
| 2002/0111758 | A1 | 8/2002 | Wang et al. |
| 2005/0065792 | A1* | 3/2005 | Gao ................. G10L 19/005 704/233 |
| 2007/0078529 | A1 | 4/2007 | Thiele et al. |
| 2008/0183311 | A1* | 7/2008 | MacArthur ........... G05B 17/02 700/29 |
| 2009/0204233 | A1* | 8/2009 | Zhan .................. G05B 17/02 700/29 |
| 2011/0130850 | A1 | 6/2011 | Zheng et al. |
| 2014/0140620 | A1* | 5/2014 | Jiyun ..................... G06T 5/002 382/173 |
| 2014/0358254 | A1 | 12/2014 | Chu et al. |

OTHER PUBLICATIONS

Badwe, Abhijit, et al., "Quantifying the impact of model-plant mismatch on controller performance," Journal of Process Control, No. 20, 2010, pp. 408-425.

Bai, Er-Wei, et al., "Convergence of the Iterative Hammerstein System Identification Algorithm," IEEE Transactions on Automatic Control, vol. 49, No. 11, Nov. 2004, pp. 1929-1940.

Bemporad, Alberto, et al., "The explicit linear quadratic regulator for constrained systems," Automatica, No. 38, 2002, pp. 3-20.

Bergh, Luis G., et al., "Spatial Control of Sheet and Film Forming Processes," The Canadian Journal of Chemical Engineering, vol. 65, Feb. 1987, pp. 148-155.

Botelho, Viviane, et al., "Perspectives and Challenges in Performance Assessment of Model Predictive Control," The Canadian Journal of Chemical Engineering, vol. 94, Jul. 2016, pp. 1225-1241.

Fortes, Corinna, et al., "Support-Vector Networks," Machine Learning, No. 20, 1995, pp. 273-297.

Fan, Junqiang, "Model Predictive Control for Multiple Cross-Directional Processes: Analysis, Tuning, and Implementation," Doctoral Thesis, Department of Electrical and Computer Engineering, University of British Columbia, Sep. 2003, 172 pages.

Giri, Fouad, et al., "Block-Oriented Nonlinear System Identification," Lecture Notes in Control and Information Sciences, Springer-Verlag, 2010, 11 pages.

Golub, Gene, et al., "Separable non-linear least squares: the variable projection method and its applications," Institute of Physics Publishing, Inverse Problems, No. 19, Feb. 2003, 26 pages.

Golub, G.H., et al., "The Differentiation of Pseudo-Inverses and Nonlinear Least Squares Problems Whose Variables Separate," SIAM Journal of Numerical Analysis, vol. 10, No. 2, Apr. 1973, pp. 413-432.

Sorinevsky, Dimitry M., et al., "Identification Tool for Cross-Directional Processes," IEEE Transactions on Control Systems Technology, vol. 11, No. 5, Sep. 2003, pp. 629-640.

Harris, Thomas J., "Assessment of Control Loop Performance," The Canadian Journal of Chemical Engineering, vol. 67, Oct. 1989, pp. 856-861.

Julien, Rhonda H., et al., "Performance assessment using a model predictive control benchmark," Journal of Process Control, No. 14, 2004, pp. 441-456.

Jung, Lennart, "Convergence Analysis of Parametric Identification Methods," IEEE Transactions on Automatic control, vol. AC-23, No. 5, Oct. 1978, pp. 770-783.

Lu, Qiugang, et al., "Performance Assessment of Cross-Directional Control for Paper Machines," IEEE Transactions on Control Systems Technology, vol. 25, No. 1, Jan. 2017, pp. 208-221.

Mahata, Kaushik, et al., "Large Sample Properties of Separable Nonlinear Least Squares Estimators," IEEE Transaction on Signal Processing, vol. 52, No. 6, Jun. 2004, pp. 1650-1658.

Morales, Rafael, M., et al., "The Robustness and Design of Constrained Cross-Directional Control via Integral Quadratic Constraints," IEEE Transactions on Control Systems Technology, vol. 19, No. 6, Nov. 2011, pp. 1421-1432.

Niarendra, K. S., et al., "An Iterative Method for the Identification of Nonlinear Systems Using a Hammerstein Model," IEEE Transactions on Automatic Control, Jul. 1966, pp. 546-550.

Olivier, Laurentz E., et al., "Model-Plant mismatch detection and model update for a run-of-mine ore milling circuit under model predictive control," Journal of Process Control, No. 23, 2013, pp. 100-107.

Qin, S. Joe, et al, "A survey of industrial model predictive control technology," Control Engineering Practice, No. 11, 2003, pp. 733-764.

Rawlings, James B., et al., "Gage Control of Film and Sheet-Forming Processes," American Institute of Chemical Engineers Journal, vol. 42, No. 3, Mar. 1996, pp. 753-766.

Rigopoulos, Apostolos, et al., "Identification of Full Profile Disturbance Models for Sheet Forming Processes," American Institute of Chemical Engineers Journal, vol. 43, No. 3, 1997, pp. 727-739.

Scholkopf, Bernhard, et al., "Estimating the Support of a High-Dimensional Distribution," Massachusetts Institute of Technology, Neural Computation No. 13, 2001, pp. 1443-1471.

Steinwart, Ingo, et al., "Support Vector Machines," Springer Science + Business Media, LLC, 2008, 22 pages.

Stewart, Gregory E., et al., "Feedback Controller Design for a Spatially Distributed System: The Paper Machine Problem," IEEE Transactions on Control Systems Technology, vol. 11, No. 5., Sep. 2003, pp. 512-628.

Sun, Zhijie, et al., "Performance monitoring of model-predictive controllers via model residual assessment," Journal of Process Control, No. 23, 2013, pp. 473-482.

Wang, Siyun, et al., "Data-Driven Plant-Model Mismatch Quantification in Input-Constrained Linear MPC," International Federation of Automatic Control, IFAC-PapersOnline 49-7, 2016, pp. 25-30.

Zhu, Yucai, "Estimation of an N-L-N Hammerstein-Wiener Model," 15th Triennial World Congress, Barcelona, Spain, International Federation of Automatic Control, 2002, pp. 247-252.

Suykens, J.A.K., et al., "Least Squares Support Vector Machine Classifiers," Neural Processing Letters, No. 9, 1999, pp. 293-300.

Taylor, A.R., et al., "Bayesian Methods for Control Loop Performance Assessment in Cross-Directional Control," Department of Engineering, University of Oxford, UK, Jan. 2005, 6 pages.

Thornhill, N.F., et al., "Refinery-wide control loop performance assessment," Journal of Process Control, No. 9, 1999, pp. 109-124.

Duncan, "The cross directional control of a web forming process," Ph.D thesis, University of London, 1989, 137 pages.

Zarrop, "Optimal experiment design for dynamic system identification," Ph.D thesis, Imperial College London (University of London), 1977, 180 pages.

Vanantwerp, Jeremy G., et al., "Cross-directional control of sheet and film processes," ScienceDirect, Automatica, No. 43, 2007, pp. 191-211.

Wang, Siyun, et al., "Autocovariance-Based MPC Model Mismatch Estimation for SISO Systems," 2015 IEEE 54th Annual Conference on Decision and Control (CDC), Osaka, Japan, Dec. 2015, pp. 3032-3037.

Yerramilli, Suraj, et al., "Detection and diagnosis of model-plant mismatch in MIMO systems using plant-model ratio," ScienceDirect, IFAC-PapersOnLine 49-1, 2016, pp. 266-271.

Zhu, Yucai, et al., "The Box-Jenkins Steiglitz-McBride algorithm," Automatica, No. 65, 2016, pp. 170-182.

Bombois, Xavier, et al., "Identification for robust H2 deconvolution filtering," Automatica, No. 46, 2010, pp. 577-584.

(56) References Cited

OTHER PUBLICATIONS

Boyd, Stephen, et al., "Linear Matrix Inequalities in System and Control Theory," Society for Industrial and Applied Mathematics, Philadelphia, PA, 1994, 205 pages.
Chu, Danlei, et al., "Online CD Performance Monitoring and Automatic Alignment Correction," Honeywell Process Solutions, North Vancouver, BC, Canada, PaperCon 2011, pp. 945-955.
Desborough, Lane, et al., "Performance Assessment Measures for Univariate Feedback Control," The Canadian Journal of Chemical Engineering, vol. 70, Dec. 1992, pp. 1186-1197.
Duncan, Stephen R., et al., "Evaluating the Performance of Cross-Directional Control Systems," Proceedings of the American Control Conference, San Diego, CA, Jun. 1999, pp. 3092-3096.
Duncan, Stephen, et al., "Performance Monitoring for Cross-Directional Control Systems," Control Systems 2000, pp. 173-177.
Featherstone, Andrew, et al., "Identification and Control of Sheet and Film Processes," Advances in Industrial Control, Springer-Verlag London Ltd., 2000, 23 pages.
Forssell, Urban, "Closed-loop Identification Methods, Theory, and Applications," Linkoping Studies in Science and Technology, Dissertations, No. 566, Department of Electrical Engienering, Linkoping University, Linkoping, Sweden, 1999, 263 pages.
Fukushima, Hiroaki, et al., "Adaptive model predictive control for a class of constrained linear systems based on the comparison model," Automatica, No. 43, 2007, pp. 301-308.
Gevers, Michel, et al., "Optimal Experiment Design for Open and Closed-Loop System Identification," research results from the Belgian Programme on Interuniversity Attraction Poles, Belgian Federal Science Policy Office, Jan. 2011, 24 pages.
Gevers, Michel, et al., "Optimal Experiment Designs with Respect to the Intended Model Application," Automatica, vol. 22, No. 5, 1986, pp. 543-554.
Goodwin, Graham C., et al., Dynamic System, Identifications: Experiment Design and Data Analysis, Mathematics in Science and Engineering, vol. 136, Academic Press, 1977, 56 pages.
Gopaluni, R. Bhushan, et al., "Identification of Symmetric Noncasual Processes: Cross-Directional Response Modelling of Papers Machines," Proceedings of the 45th IEEE Conference on Decision & Control, San Diego, CA, Dec. 2006, pp. 6744-6749.
Grimble, M.J., "Generalized Minimum Variance Control Law Revisited," Optimal Control Applications & Methods, vol. 9, 1988, pp. 63-77.
Grimble, M.J., et al., "Weighting Selection for Controller Benchmarking and Tuning," Ist-2000-29239 PAM, Performance Assessment and Benchmarking of Controls, 2001-2004, ICC/219/Dec. 2004, PAM Document Code: PAM-12-TN-1-V1, Industrial Control Centre, University of Strathclyde, UK, Dec. 2004, 15 pages.
Harris, T. J., et al., "Performance Assessment of Multivariable Feedback Controllers," Automatica, vol. 32, No. 11, 1996, pp. 1505-1518.
Harris, T. J., et al., "A review of performance monitoring and assessment techniques for univariate and multivariate control systems," Journal of Process Control 9, 1999, pp. 1-17.
Harrison, Christopher A., et al., "Discriminating between disturbance and process model mismatch in model predictive control," Journal of Process Control, No. 19, 2009, pp. 1610-1616.
Honeywell, "Experion MX Color Control," Product Information Note, Model Q5976-51, 52, and 53, Automation & Control Solutions, Process Solutions, May 2011, 5 pages.
Honeywell, "Experion MX Color Shade Change Control," Product Information Note, Model Q5979-50, Automation 3, Control Solutions, Process Solutions, May 2011, 4 pages.
Honeywell, "Experion MX Machine Direction Controls," Product Information Note, Automation & Control Solutions, Process Solutions, May 2011, 3 pages.
Huang, Biao, et al., "Performance Assessment of Control Loops, Theory and Applications," Advances in Industrial Control, Springer-Verlag London Ltd., 1962, 16 pages.
Huang, Biao, et al., "On-Line Control Performance Monitoring of MIMO Processes," WP9-3:50, Proceedings of the American Control Conference, Seattle, Washington, Jun. 1995, pp. 1250-1254.
Huang, Biao, et al., "Performance Assessment of Multivariate Control Loops on a Paper-Machine Headbox," The Canadian Journal of Chemical Engineering, vol. 75, Feb. 1997, pp. 134-142.
Jansson, Henrik, et al., "Input Design Via LMIs Admitting Frequency-Wise Model Specifications in Confidence Regions," IEEE Transactions on Automatic Control, vol. 50, No. 10, Oct. 2005, pp. 1534-1549.
Jansson, Henrik, "Experiment Design with Applications in Identification for Control," Doctoral Thesis, Automatic Control, Department of Signals, Sensors and Systems, Royal Institute of Technology, Stockholm, Sweden, 2004, 217 pages.
Jelali, Mohieddine, "Control Performance Management in Industrial Automation, Assessment, Diagnosis and Improvement of Control Loop Performance," Advances in Industrial Control, Springer-Verlag London, 2013, 32 pages.
Ko, Byung-Su, et al., "Performance Assessment of Constrained Model Predictive Control Systems," Process Systems Engineering, AIChE Journal, vol. 47, No. 6, Jun. 2001, pp. 1363-1371.
Li, Q. et al., "A relative performance monitor for process controllers," International Journal of Adaptive Control and Signal Processing, No. 17, 2003, pp. 685-708.
Ljung, Lennart, "Asymptotic Variance Expressions for Identified Black-Box Transfer Function Models," IEEE Transactions on Automatic Control, vol. AC-30, No. 9, Sep. 1985, pp. 834-844.
Lynch, C.B., et al., "Control Loop Performance Monitoring," IEEE Transactions on Control Systems Technology, vol. 4, No. 2, Mar. 1996, pp. 185-192.
Mehra, Raman K., "Optimal Input Signals for Parameter Estimation in Dynamic Systems—Survey and New Results," IEEE Transactions on Automatic Control, vol. AC-19, No. 6, Dec. 1974, pp. 753-768.
Ordys, Andnzej W., et al., "Process Control Performance Assessment From Theory to Implementation" Advances in Industrial Control, Springer-Verlag London Limited, 2007, 53 pages.
Qin, S. Joe, "Control performance monitoring—a review and assessment," Computers and Chemical Engineering, No. 23, 1998, pp. 173-186.
Roweis, Sam T., et al., "Nonlinear Dimensionality Reduction by Locally Linear Embedding," Science, vol. 290, Dec. 2000, pp. 2323-2326.
Stewart, Gregory Edward, "Two Dimensional Loop Shaping Controller Design for Paper Machine Cross-Directional Processes," Doctoral Thesis, Department of Electrical and Computer Engineering, The University of British Columbia, Aug. 2000, 143 pages.
Babji et al., "Time-Delay Estimation in Closed-Loop Processes Using Average Mutual Information Theory", Control and Intelligent Systems, vol. 37, No. 3, 2009, 7 pages.
Badwe et al., "Closed-loop identification using direct approach and high order ARX/GOBF-ARX models", Journal of Process Control 21, 2011, 16 pages.
Bjorklund et al., "A Review of Time-Delay Estimation Techniques", Proceedings of the 42nd IEEE Conference on Decision and Control, Dec. 2003, 6 pages.
Esmaili et al., "Direct and two-step methods for closed-loop identification: a comparison of asymptotic and finite data set performance", Journal of Process Control 10, 2000, 13 pages.
Forssell et al., "A Projection Method for Closed-Loop Identification", IEEE Transactions on Automatic Control, vol. 45, No. 11, Nov. 2000, 6 pages.
Forssell et al., "Closed-loop identification revisited", Automatica 35, 1999, 27 pages.
Gevers et al., "Asymptotic variance expressions for closed-loop identification", Automatica 37, 2001, 6 pages.
Gevers et al., Identification and the Information Matrix: How to Get Just Sufficiently Rich?, IEEE Transactions on Automatic Control, vol. 54, No. 12, Dec. 2009, 13 pages.
Gustavsson et al., "Survey Paper—Identification of Processes in Closed Loop—Identifiability and Accuracy Aspects", Automatica, vol. 13, 1977, 17 pages.

(56) References Cited

OTHER PUBLICATIONS

Hjalmarsson et al., "For Model-based Control Design, Closed-loop Identification Gives Better Performance*", Automatica, vol. 32, No. 12, 1996, 15 pages.
Honeywell Process Solutions, "White Paper—Experion MX—Quality Control System Delivers Lowest Total Cost of Ownership", Sep. 2010, 8 pages.
Lee et al., "On Some Key Issues in the Windsurfer Approach to Adaptive Robust Control", Automatica, vol. 31, No. 11, 1995, 18 pages.
Ljung, "System Identification Theory for the User—Second Edition", Prentice Hall, 1999, 129 pages.
Ljung et al., "Asymptotic Properties of the Least-Squares Method for Estimating Transfer Functions and Disturbance Spectra", Advances in Applied Probability, 1992, 30 pages.
Shardt et al., "Closed-loop identification condition for ARMAX models using routine operating data", Automatica 47, 2011, 4 pages.
Soderstrom et al., "System Identification", Prentice Hall, 1989, 43 pages.
Van Den Hof et al., "An Indirect Method for Transfer Function Estimation from Closed Loop Data", Automatica, vol. 29, No. 6, 1993, 5 pages.
Wang et al., "Closed-loop identification via output fast sampling", Journal of Process Control 14, 2004, 16 pages.
Zhu et al., "The Box-Jenkins Steiglitz-McBride algorithm", Automatica 65, 2016, 13 pages.
Huynh, "A Modified Shuffled Frog Leaping Algorithm for Optimal Tuning of Multivariable PID Controllers", IEEE International Conference on Industrial Technology, Apr. 2008, pp. 1-6.
Biagiola et al., "Identification of Uncertain MIMO Wiener and Hammerstein Models", Computers and Chemical Engineering, Jun. 2011, vol. 35(12), 9 pages.
Maciejowski, "Predictive Control with Constraints", Pearson Education Limited, 2002, 6 pages.
Skogestad et al., "Multivariable Feedback Control: Analysis and Design", John Wiley & Sons, 1996, 8 pages.
Chu et al., "Model Predictive Control and Optimization for Papermaking Processes", Advanced Model Predictive Control, Jul. 2011, pp. 309-342.
Fan et al., "Two-Dimensional Frequency Response Analysis and Insights for Weight Selection in Cross-Directional Model Predictive Control", Proceedings from 42nd IEEE, Dec. 2003, 7 pages.
Garriga et al., "Model Predictive Controller Tuning via Eigenvalue Placement", 2008 American Control Conference, Jun. 2008, 6 pages.
Mohtadi et al., "Frequency response characteristics of MIMO GPC", Int. J. Control, vol. 55, No. 4, 1992, 24 pages.
Rowe et al., "Tuning MPC using H∞ Loop Shaping", Proceedings of the American Control Conference, Jun. 2000, 5 pages.
Shah et aL, "Tuning MPC for Desired Closed-Loop Performance for MIMO Systems", American Control Conference, Jun.-Jul. 2011, pp. 4404-4409.
Cairano et al., "Model Predictive Control Tuning by Controller Matching", IEEE Transactions on Automatic Control, vol. 55, No. 1, Jan. 2010, pp. 185-190.
Kong et al., "Predictive metamorphic control", Automatica 49, 2013, pp. 3670-3676.
Garriga et al., "Model Predictive Control Tuning Methods: A Review", American Chemical Society, Mar. 2010, pp. 3505-3515.
Angeli et al., "An ellipsoidal off-line MPC scheme for uncertain polytopic discrete-time systems", Automatica 44, 2008, pp. 3113-3119.
Vlassis et al., "Polytopic uncertainty for linear systems: New and old complexity results", Luxembourg Centre for Systems Biomedicine, Feb. 2014; 13 pages.
He et al., "User Friendly Robust MPC Tuning of Uncertain Paper-Making Processes", Department of Electrical and Computer Engineering, University of Alberta, Feb. 2015, 6 pages.
Hu et al., "Systematic H∞ weighting function selection and its application to the real-time control of a vertical take-off aircraft", Control Engineering Practice, vol. 8, 2000, pp. 241-252.
Bazaraa et al., "Nonlinear Programming: Theory and Algorithms", John Wiley & Sons, 1979, 3 pages.
Zhou et al., "Essentials of Robust Control: Chapter 9 Linear Fractional Transformation", Prentice Hall, 1998, 3 pages.
Maciejowski, "Predictive Control with Constraints: Section 7.5 Reference trajectory and pre-filter", Prentice Hall, 2002, pp. 211-214.
U.S. Appl. No. 14/314,221 entitled "Method and Apparatus for Specifying and Visualizing Robust Tuning of Model-Based Controllers" filed Jun. 25, 2014, 49 pages.
International Search Report dated Jun. 9, 2015 in connection with International Application No. PCT/CA2015/000146, 3 pages.
Written Opinion of the International Searching Authority dated Jun. 9, 2015 in connection with International Application No. PCT/CA2015/000146, 4 pages.
International Search Report and Written Opinion of the International Searching Authority dated Jun. 22, 2016 in connection with International Application No. PCT/CA2016/000153, 9 pages.
U.S. Appl. No. 14/729,930 entitled "Method and Apparatus for Robust Tuning of Model-Based Process Controllers used with Uncertain Multiple-Input, Multiple-Output (MIMO) Processes", filed Jun. 3, 2015, 36 pages.
U.S. Appl. No. 15/611,082 entitled "Model-Plant Mismatch Detection with Support Vector Machine for Cross-Directional Process Behavior Monitoring", filed Jun. 1, 2017, 56 pages.
U.S. Appl. No. 15/636,347 entitled "Model-Plant Mismatch Detection Using Model Parameter Data Clustering for Paper Machines or Other Systems", filed Jun. 28, 2017, 44 pages.

* cited by examiner

CLOSED-LOOP MODEL PARAMETER IDENTIFICATION TECHNIQUES FOR INDUSTRIAL MODEL-BASED PROCESS CONTROLLERS

CROSS-REFERENCE TO RELATED APPLICATION AND PRIORITY CLAIM

This application claims priority under 35 U.S.C. § 119(e) to U.S. Provisional Patent Application No. 62/395,904 filed on Sep. 16, 2016, which is hereby incorporated by reference in its entirety.

TECHNICAL FIELD

This disclosure relates generally to industrial process control and automation systems. More specifically, this disclosure relates to closed-loop model parameter identification techniques for industrial model-based process controllers.

BACKGROUND

Industrial process control and automation systems are often used to automate large and complex industrial processes. These types of control and automation systems routinely include process controllers and field devices like sensors and actuators. Some of the process controllers typically receive measurements from the sensors and generate control signals for the actuators. Model-based industrial process controllers are one type of process controller routinely used to control the operations of industrial processes. Model-based process controllers typically use one or more models to mathematically represent how one or more properties within an industrial process respond to changes made to the industrial process.

SUMMARY

This disclosure provides closed-loop model parameter identification techniques for industrial model-based process controllers.

In a first embodiment, a method includes obtaining closed-loop data associated with operation of an industrial process controller, where the industrial process controller is configured to control at least part of an industrial process using at least one model. The method also includes generating at least one noise model associated with the industrial process controller using at least some of the closed-loop data. The method further includes filtering the closed-loop data based on the at least one noise model. In addition, the method includes generating one or more model parameters for the industrial process controller using the filtered closed-loop data.

In a second embodiment, an apparatus includes at least one memory configured to store closed-loop data associated with operation of an industrial process controller that is configured to control at least part of an industrial process using at least one model. The apparatus also includes at least one processing device configured to generate at least one noise model associated with the industrial process controller using at least some of the closed-loop data. The at least one processing device is also configured to filter the closed-loop data based on the at least one noise model and generate one or more model parameters for the industrial process controller using the filtered closed-loop data.

In a third embodiment, a non-transitory computer readable medium contains instructions that, when executed by at least one processing device, cause the at least one processing device to obtain closed-loop data associated with operation of an industrial process controller, where the industrial process controller is configured to control at least part of an industrial process using at least one model. The medium also contains instructions that, when executed by the at least one processing device, cause the at least one processing device to generate at least one noise model associated with the industrial process controller using at least some of the closed-loop data. The medium further contains instructions that, when executed by the at least one processing device, cause the at least one processing device to filter the closed-loop data based on the at least one noise model. In addition, the medium contains instructions that, when executed by the at least one processing device, cause the at least one processing device to generate one or more model parameters for the industrial process controller using the filtered closed-loop data.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 4, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

As described above, model-based industrial process controllers are one type of process controller routinely used to control the operations of industrial processes. Model-based process controllers typically use one or more models to mathematically represent how one or more properties within an industrial process respond to changes made to the industrial process. Model-based controllers typically require accurate models of process behaviors in order to perform well. As conditions related to an industrial process change, the models for that process typically need to be updated or replaced in order to maintain good quality of control over the process.

Closed-loop identification refers to a technique where process model parameters are identified based on data from an industrial process operating under closed-loop control. It is often desirable to be able to update or replace a process model based on closed-loop data since this can eliminate the need to turn off automatic controls and disturb the industrial process to generate open-loop data. However, one problem with closed-loop identification is that using standard identification techniques (such as those suitable for analysis of open-loop data) can result in biased or inaccurate model parameter estimates, particularly when using direct identification methods without any knowledge about true process and noise model structures.

This disclosure provides useful and versatile approaches for identifying process model parameters using closed-loop process data while reducing or avoiding bias in the identified model parameters. These techniques enable automatic closed-loop process model updating to be used for model-based controllers, such as those used in machine-direction (MD) control of paper machines or other systems. These types of techniques can provide various benefits depending on the implementation. For example, the proposed techniques can overcome biasing when performing closed-loop identification, resulting in more accurate process models being generated. Moreover, with automatic closed-loop process model updating, model-based controls could be maintained to perform at the highest level without needing to take those controls offline for plant experiments. Further, these approaches can reduce the time and effort needed in updating process models. In addition, overall controls can be kept functioning at high level at all times, reducing losses due to poor quality production.

Figure 1:
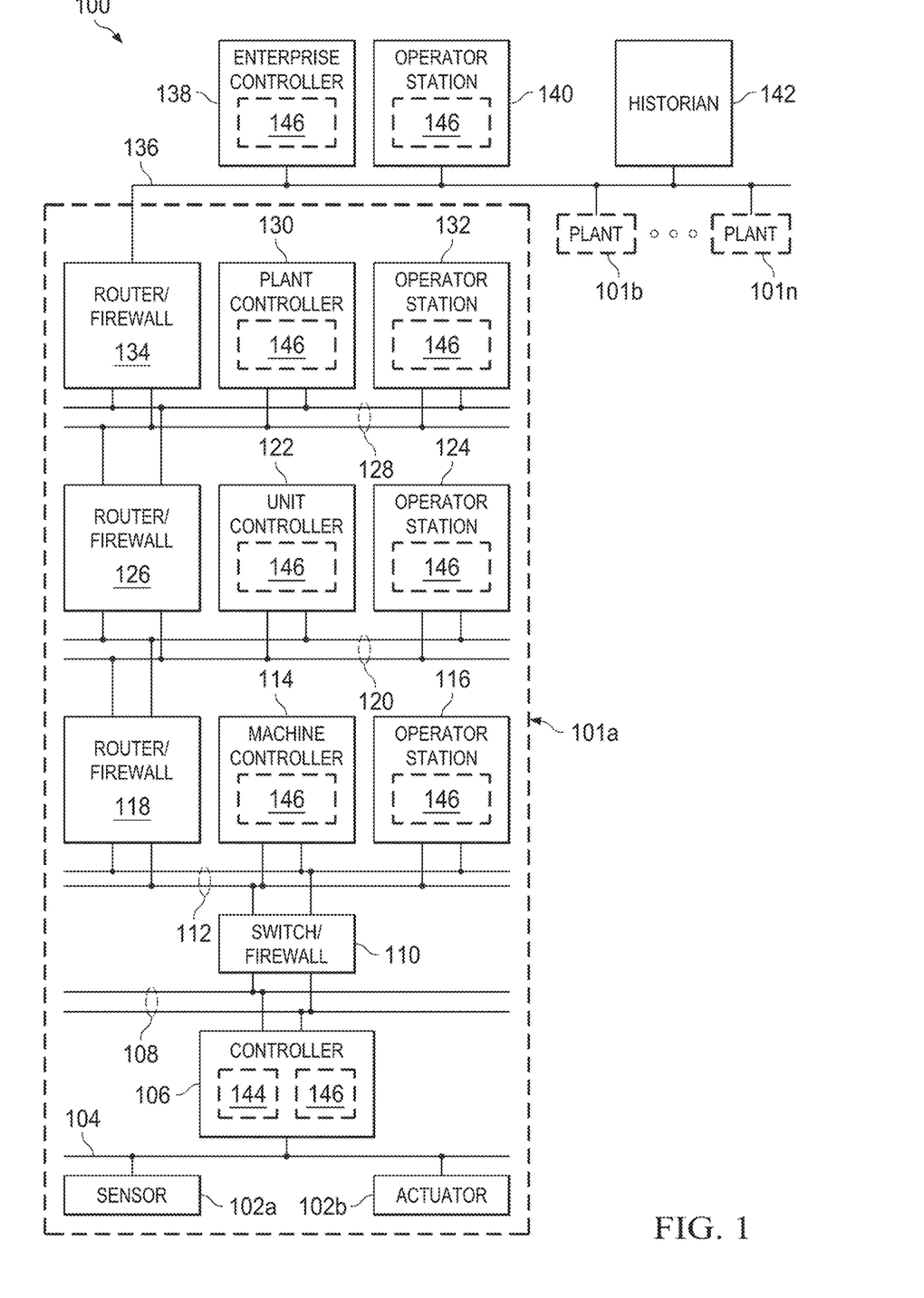
FIG. 1 illustrates a first example industrial process control and automation system according to this disclosure.

FIG. 1 illustrates an example industrial process control and automation system 100 according to this disclosure. As shown in FIG. 1, the system 100 includes various components that facilitate production or processing of at least one product or other material. For instance, the system 100 is used here to facilitate control over components in one or multiple plants 101a-101n. Each plant 101a-101n represents one or more processing facilities (or one or more portions thereof), such as one or more manufacturing facilities for producing at least one product or other material. In general, each plant 101a-101n may implement one or more processes and can individually or collectively be referred to as a process system. A process system generally represents any system or portion thereof configured to process one or more products or other materials in some manner.

In FIG. 1, the system 100 is implemented using the Purdue model of process control. In the Purdue model, "Level 0" may include one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, or flow rate. Also, the actuators 102b could alter a wide variety of characteristics in the process system. The sensors 102a and actuators 102b could represent any other or additional components in any suitable process system. Each of the sensors 102a includes any suitable structure for measuring one or more characteristics in a process system. Each of the actuators 102b includes any suitable structure for operating on or affecting one or more conditions in a process system.

One or more networks 104 are coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent an Ethernet network, an electrical signal network (such as a HART or FOUNDATION FIELDBUS network), a pneumatic control signal network, or any other or additional type(s) of network(s).

In the Purdue model, "Level 1" includes one or more controllers 106, which are coupled to the network 104. Among other things, each controller 106 may use the measurements from one or more sensors 102a to control the operation of one or more actuators 102b. Each controller 106 includes any suitable structure for controlling one or more aspects of a process system. As a particular example, each controller 106 could represent a computing device running a real-time operating system.

Redundant networks 108 are coupled to the controllers 106. The networks 108 facilitate interaction with the controllers 106, such as by transporting data to and from the controllers 106. The networks 108 could represent any suitable redundant networks. As particular examples, the networks 108 could represent a pair of Ethernet networks or a redundant pair of Ethernet networks, such as a FAULT TOLERANT ETHERNET (FTE) network from HONEYWELL INTERNATIONAL INC.

At least one switch/firewall 110 couples the networks 108 to two networks 112. The switch/firewall 110 may transport traffic from one network to another. The switch/firewall 110 may also block traffic on one network from reaching another network. The switch/firewall 110 includes any suitable structure for providing communication between networks, such as a HONEYWELL CONTROL FIREWALL (CF9) device. The networks 112 could represent any suitable networks, such as a pair of Ethernet networks or an FTE network.

In the Purdue model, "Level 2" may include one or more machine-level controllers 114 coupled to the networks 112. The machine-level controllers 114 perform various functions to support the operation and control of the controllers 106, sensors 102a, and actuators 102b, which could be associated with a particular piece of industrial equipment (such as a boiler or other machine). For example, the machine-level controllers 114 could log information collected or generated by the controllers 106, such as measurement data from the sensors 102a or control signals for the actuators 102b. The machine-level controllers 114 could also execute applications that control the operation of the controllers 106, thereby controlling the operation of the actuators 102b. In addition, the machine-level controllers 114 could provide secure access to the controllers 106. Each of the machine-level controllers 114 includes any suitable structure for providing access to, control of, or operations related to a machine or other individual piece of equipment. Each of the machine-level controllers 114 could, for example, represent a server computing device running a MICROSOFT WINDOWS operating system. Although not shown, different machine-level controllers 114 could be used to control different pieces of equipment in a process system (where each piece of equipment is associated with one or more controllers 106, sensors 102a, and actuators 102b).

One or more operator stations 116 are coupled to the networks 112. The operator stations 116 represent computing or communication devices providing user access to the machine-level controllers 114, which could then provide user access to the controllers 106 (and possibly the sensors 102a and actuators 102b). As particular examples, the operator stations 116 could allow users to review the operational history of the sensors 102a and actuators 102b using information collected by the controllers 106 and/or the machine-level controllers 114. The operator stations 116 could also allow the users to adjust the operation of the sensors 102a, actuators 102b, controllers 106, or machine-level controllers 114. In addition, the operator stations 116 could receive and display warnings, alerts, or other messages or displays generated by the controllers 106 or the machine-level controllers 114. Each of the operator stations 116 includes any suitable structure for supporting user access and control of one or more components in the system 100. Each of the operator stations 116 could, for example, represent a computing device running a MICROSOFT WINDOWS operating system.

At least one router/firewall 118 couples the networks 112 to two networks 120. The router/firewall 118 includes any suitable structure for providing communication between networks, such as a secure router or combination router/firewall. The networks 120 could represent any suitable networks, such as a pair of Ethernet networks or an FTE network.

In the Purdue model, "Level 3" may include one or more unit-level controllers 122 coupled to the networks 120. Each unit-level controller 122 is typically associated with a unit in a process system, which represents a collection of different machines operating together to implement at least part of a process. The unit-level controllers 122 perform various functions to support the operation and control of components in the lower levels. For example, the unit-level controllers 122 could log information collected or generated by the components in the lower levels, execute applications that control the components in the lower levels, and provide secure access to the components in the lower levels. Each of the unit-level controllers 122 includes any suitable structure for providing access to, control of, or operations related to one or more machines or other pieces of equipment in a process unit. Each of the unit-level controllers 122 could, for example, represent a server computing device running a MICROSOFT WINDOWS operating system. Although not shown, different unit-level controllers 122 could be used to control different units in a process system (where each unit is associated with one or more machine-level controllers 114, controllers 106, sensors 102a, and actuators 102b).

Access to the unit-level controllers 122 may be provided by one or more operator stations 124. Each of the operator stations 124 includes any suitable structure for supporting user access and control of one or more components in the system 100. Each of the operator stations 124 could, for example, represent a computing device running a MICROSOFT WINDOWS operating system.

At least one router/firewall 126 couples the networks 120 to two networks 128. The router/firewall 126 includes any suitable structure for providing communication between networks, such as a secure router or combination router/firewall. The networks 128 could represent any suitable networks, such as a pair of Ethernet networks or an FTE network.

In the Purdue model, "Level 4" may include one or more plant-level controllers 130 coupled to the networks 128. Each plant-level controller 130 is typically associated with one of the plants 101a-101n, which may include one or more process units that implement the same, similar, or different processes. The plant-level controllers 130 perform various functions to support the operation and control of components in the lower levels. As particular examples, the plant-level controller 130 could execute one or more manufacturing execution system (MES) applications, scheduling applications, or other or additional plant or process control applications. Each of the plant-level controllers 130 includes any suitable structure for providing access to, control of, or operations related to one or more process units in a process plant. Each of the plant-level controllers 130 could, for example, represent a server computing device running a MICROSOFT WINDOWS operating system.

Access to the plant-level controllers 130 may be provided by one or more operator stations 132. Each of the operator stations 132 includes any suitable structure for supporting user access and control of one or more components in the system 100. Each of the operator stations 132 could, for example, represent a computing device running a MICROSOFT WINDOWS operating system.

At least one router/firewall 134 couples the networks 128 to one or more networks 136. The router/firewall 134 includes any suitable structure for providing communication between networks, such as a secure router or combination router/firewall. The network 136 could represent any suitable network, such as an enterprise-wide Ethernet or other network or all or a portion of a larger network (such as the Internet).

In the Purdue model, "Level 5" may include one or more enterprise-level controllers 138 coupled to the network 136. Each enterprise-level controller 138 is typically able to perform planning operations for multiple plants 101a-101n and to control various aspects of the plants 101a-101n. The enterprise-level controllers 138 can also perform various functions to support the operation and control of components in the plants 101a-101n. As particular examples, the enterprise-level controller 138 could execute one or more order processing applications, enterprise resource planning (ERP) applications, advanced planning and scheduling (APS) applications, or any other or additional enterprise control applications. Each of the enterprise-level controllers 138 includes any suitable structure for providing access to, control of, or operations related to the control of one or more plants. Each of the enterprise-level controllers 138 could, for example, represent a server computing device running a MICROSOFT WINDOWS operating system. In this document, the term "enterprise" refers to an organization having one or more plants or other processing facilities to be managed. Note that if a single plant 101a is to be managed, the functionality of the enterprise-level controller 138 could be incorporated into the plant-level controller 130.

Access to the enterprise-level controllers 138 may be provided by one or more operator stations 140. Each of the operator stations 140 includes any suitable structure for supporting user access and control of one or more components in the system 100. Each of the operator stations 140 could, for example, represent a computing device running a MICROSOFT WINDOWS operating system.

A historian 142 is also coupled to the network 136 in this example. The historian 142 could represent a component that stores various information about the system 100. The historian 142 could, for example, store information used during production scheduling and optimization. The historian 142 represents any suitable structure for storing and facilitating retrieval of information. Although shown as a single centralized component coupled to the network 136, the historian 142 could be located elsewhere in the system 100, or multiple historians could be distributed in different locations in the system 100.

At least one of the controllers shown in FIG. 1 could denote a model-based controller that operates using one or more process models 144. For example, each of the controllers 106 could operate using one or more process models 144 to determine, based on measurements from one or more sensors 102a, how to adjust one or more actuators 102b. In some embodiments, each model 144 associates one or more manipulated or disturbance variables with one or more controlled variables. A controlled variable (CV) generally represents a variable that can be measured or inferred and that is ideally controlled to be at or near a desired setpoint or within a desired range of values. A manipulated variable (MV) generally represents a variable that can be adjusted in order to alter one or more controlled variables. A disturbance variable (DV) generally denotes a variable whose value can be considered but cannot be controlled. As a simple example, a flow rate of material through a pipe could denote a controlled variable, a valve opening for a valve that controls the flow rate of material could denote a manipulated variable, and an ambient temperature around the pipe or the valve could denote a disturbance variable.

As noted above, the process models 144 need to be reasonably accurate for model-based controllers to operate effectively, and the process models 144 typically need to be updated or replaced as conditions related to an industrial process change. However, it is often difficult to use routine operating data to identify process model parameters when performing standard identification techniques since the model parameter estimates can be biased or inaccurate.

In accordance with this disclosure, at least one component of the system 100 includes a tool 146 that analyzes routine operating data for at least one model-based controller in order to perform closed-loop identification. Example closed-loop identification processes are described below. The tool 146 could be implemented in any suitable manner and using any suitable device. For example, the tool 146 could reside on any of the controllers or operator stations shown in FIG. 1. The tool 146 could also reside on any other suitable device(s) in FIG. 1, such as on a dedicated computing device. The tool 146 could be implemented using any suitable hardware or any suitable combination of hardware and software/firmware instructions. In particular embodiments, the tool 146 is implemented using software/firmware instructions that are executed by at least one processor of a computing device.

Although FIG. 1 illustrates one example of an industrial process control and automation system 100, various changes may be made to FIG. 1. For example, a control and automation system could include any number of sensors, actuators, controllers, servers, operator stations, networks, models, tools, and other components. Also, the makeup and arrangement of the system 100 in FIG. 1 is for illustration only. Components could be added, omitted, combined, further subdivided, or placed in any other suitable configuration according to particular needs. Further, particular functions have been described as being performed by particular components of the system 100. This is for illustration only. In general, process control and automation systems are highly configurable and can be configured in any suitable manner according to particular needs. In addition, while FIG. 1 illustrates one example environment in which closed-loop identification for model parameters can be used, this functionality can be used in any other suitable device or system.

Figure 2:
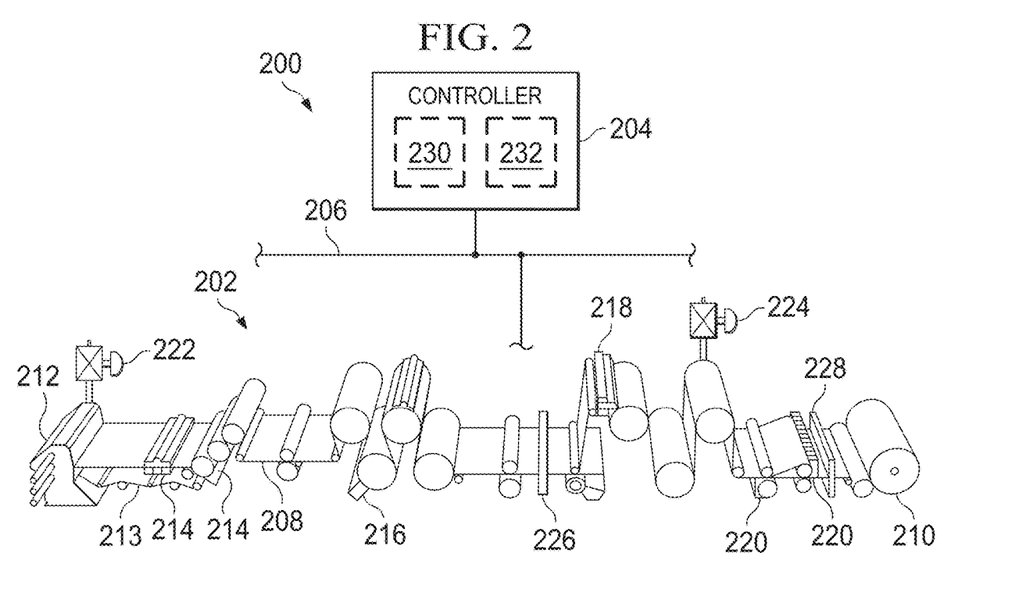
FIG. 2 illustrates a second example industrial process control and automation system according to this disclosure.

FIG. 2 illustrates a second example industrial process control and automation system 200 according to this disclosure. In particular, the system 200 of FIG. 2 denotes an example web manufacturing or processing system. As shown in FIG. 2, the system 200 includes a paper machine 202, a controller 204, and a network 206. The paper machine 202 includes various components used to produce a paper product, namely a paper web 208 that is collected at a reel 210. The controller 204 monitors and controls the operation of the paper machine 202, which may help to maintain or increase the quality of the paper web 208 produced by the paper machine 202. The machine direction (MD) of the web 208 denotes the direction along the (longer) length of the web 208, while the cross direction (CD) of the web 208 denotes the direction along the (shorter) width of the web 208.

In this example, the paper machine 202 includes at least one headbox 212, which distributes a pulp suspension uniformly across the machine onto a continuous moving wire screen or mesh 213. The pulp suspension entering the headbox 212 may contain, for example, 0.2-3% wood fibers, fillers, and/or other materials, with the remainder of the suspension being water. Arrays of drainage elements 214, such as vacuum boxes, remove as much water as possible to initiate the formation of the web 208. An array of steam actuators 216 produces hot steam that penetrates the paper web 208 and releases the latent heat of the steam into the paper web 208. An array of rewet shower actuators 218 adds small droplets of water (which may be air atomized) onto the surface of the paper web 208. The paper web 208 is then often passed through a calender having several nips of counter-rotating rolls. Arrays of induction heating actuators 220 heat the shell surfaces of various ones of these rolls.

Two additional actuators 222-224 are shown in FIG. 2. A thick stock flow actuator 222 controls the consistency of incoming stock received at the headbox 212. A steam flow actuator 224 controls the amount of heat transferred to the paper web 208 from drying cylinders. The actuators 222-224 could, for example, represent valves controlling the flow of stock and steam, respectively. These actuators may be used for controlling the dry weight and moisture of the paper web 208. Additional flow actuators may be used to control the proportions of different types of pulp and filler material in the thick stock and to control the amounts of various additives (such as retention aid or dyes) that are mixed into the stock.

This represents a brief description of one type of paper machine 202 that may be used to produce a paper product. Additional details regarding this type of paper machine 202 are well-known in the art and are not needed for an understanding of this disclosure. Also, while described as being used to manufacture a paper web, other types of machines for manufacturing or processing any suitable webs could be used.

In order to control the paper-making process, one or more properties of the paper web 208 may be continuously or repeatedly measured. The web properties can be measured at one or various stages in the manufacturing process. This information may then be used to adjust the paper machine 202, such as by adjusting various actuators within the paper machine 202. This may help to compensate for any variations of the web properties from desired targets, which may help to ensure the quality of the web 208. As shown in FIG. 2, the paper machine 202 includes one or more scanners 226-228, each of which may include one or more sensors. Each scanner 226-228 is capable of measuring one or more characteristics of the paper web 208. For example, each scanner 226-228 could include sensors for measuring the tension, caliper, moisture, anisotropy, basis weight, color, gloss, sheen, haze, surface features (such as roughness, topography, or orientation distributions of surface features), or any other or additional characteristics of the paper web 208.

Each scanner 226-228 includes any suitable structure or structures for measuring or detecting one or more characteristics of the paper web 208, such as one or more sets of sensors. The use of scanners represents one particular embodiment for measuring web properties. Other embodiments could be used, such as those including one or more stationary sets or arrays of sensors, deployed in one or a few locations across the web or deployed in a plurality of locations across the whole width of the web such that substantially the entire web width is measured.

The controller 204 receives measurement data from the scanners 226-228 and uses the data to control the paper machine 202. For example, the controller 204 may use the measurement data to adjust any of the actuators or other components of the paper machine 202. The controller 204 includes any suitable structure for controlling the operation of at least part of the paper machine 202, such as a computing device. Note that while a single controller 204 is shown here, multiple controllers 204 could be used, such as different controllers that control different variables of the web.

The network 206 is coupled to the controller 204 and various components of the paper machine 202 (such as the actuators and scanners). The network 206 facilitates communication between components of the system 200. The network 206 represents any suitable network or combination of networks facilitating communication between components in the system 200. The network 206 could, for example, represent a wired or wireless Ethernet network, an electrical signal network (such as a HART or FOUNDATION FIELDBUS network), a pneumatic control signal network, or any other or additional network(s).

The controller(s) 204 can operate to control one or more aspects of the paper machine 202 using one or more models 230. For example, each model 230 could associate one or more manipulated or disturbance variables with one or more controlled variables. The controlled variables typically include one or more properties of the web 208. The manipulated variables typically include setpoints, settings, or other values used by various actuators in the system 200.

In accordance with this disclosure, at least one component of the system 200 includes a tool 232 that analyzes routine operating data for closed-loop model parameter identification. Example closed-loop identification processes are described below. The tool 232 could be implemented in any suitable manner and using any suitable device, such as when the tool 232 resides on the controller 204 or a dedicated computing device. The tool 232 could be implemented using any suitable hardware or any suitable combination of hardware and software/firmware instructions, such as when the tool 232 is implemented using software/firmware instructions that are executed by at least one processor of a computing device.

Although FIG. 2 illustrates another example of an industrial process control and automation system 200, various changes may be made to FIG. 2. For example, other systems could be used to produce other paper or non-paper products. Also, while shown as including a single paper machine 202 with various components and a single controller 204, the system 200 could include any number of paper machines or other machinery having any suitable structure, and the system 200 could include any number of controllers. In addition, while FIG. 2 illustrates another example environment in which closed-loop identification for model parameters can be used, this functionality can be used in any other suitable device or system.

Figure 3:
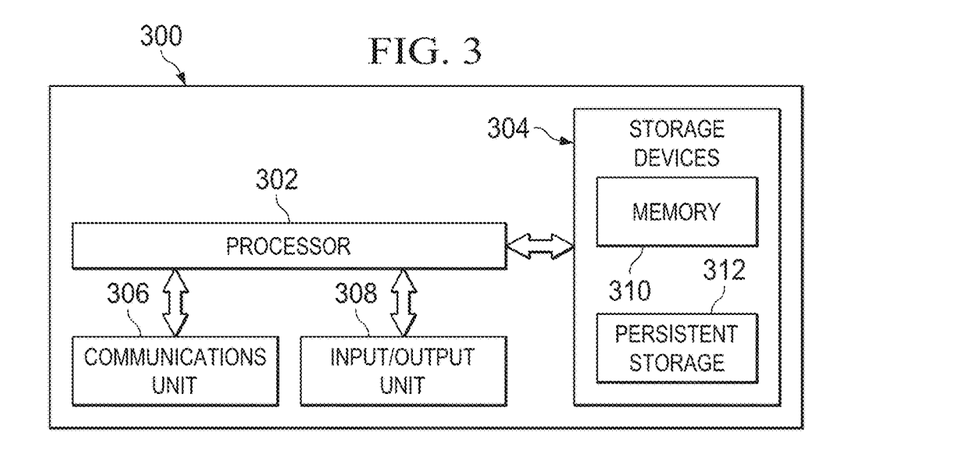
FIG. 3 illustrates an example device supporting closed-loop model parameter identification for industrial model-based process controllers according to this disclosure.

FIG. 3 illustrates an example device 300 supporting closed-loop model parameter identification for industrial model-based process controllers according to this disclosure. The device 300 could, for example, represent any of the devices in FIGS. 1 and 2 that can execute the tool 146, 232. However, the device 300 could be used in any other suitable system, and the tool 146, 232 could be implemented using any other suitable device.

As shown in FIG. 3, the device 300 includes at least one processing device 302, at least one storage device 304, at least one communications unit 306, and at least one input/output (I/O) unit 308. The processing device 302 executes instructions that may be loaded into a memory device 310. The processing device 302 may include any suitable number(s) and type(s) of processors or other devices in any suitable arrangement. Example types of processing devices 302 include microprocessors, microcontrollers, digital signal processors, field programmable gate arrays, application specific integrated circuits, and discrete logic devices.

The memory device 310 and a persistent storage 312 are examples of storage devices 304, which represent any structure(s) capable of storing and facilitating retrieval of information (such as data, program code, and/or other suitable information on a temporary or permanent basis). The memory device 310 may represent a random access memory or any other suitable volatile or non-volatile storage device(s). The persistent storage 312 may contain one or more components or devices supporting longer-term storage of data, such as a read only memory, hard drive, Flash memory, or optical disc.

The communications unit 306 supports communications with other systems or devices. For example, the communications unit 306 could include a network interface card or a wireless transceiver facilitating communications over a wired or wireless network. The communications unit 306 may support communications through any suitable physical or wireless communication link(s).

The I/O unit 308 allows for input and output of data. For example, the I/O unit 308 may provide a connection for user input through a keyboard, mouse, keypad, touchscreen, or other suitable input device. The I/O unit 308 may also send output to a display, printer, or other suitable output device.

Although FIG. 3 illustrates one example of a device 300 supporting closed-loop model parameter identification for industrial model-based process controllers, various changes may be made to FIG. 3. For example, various components in FIG. 3 could be combined, further subdivided, rearranged, or omitted and additional components could be added according to particular needs. Also, computing devices can come in a wide variety of configurations, and FIG. 3 does not limit this disclosure to any particular configuration of computing device.

Figure 4:
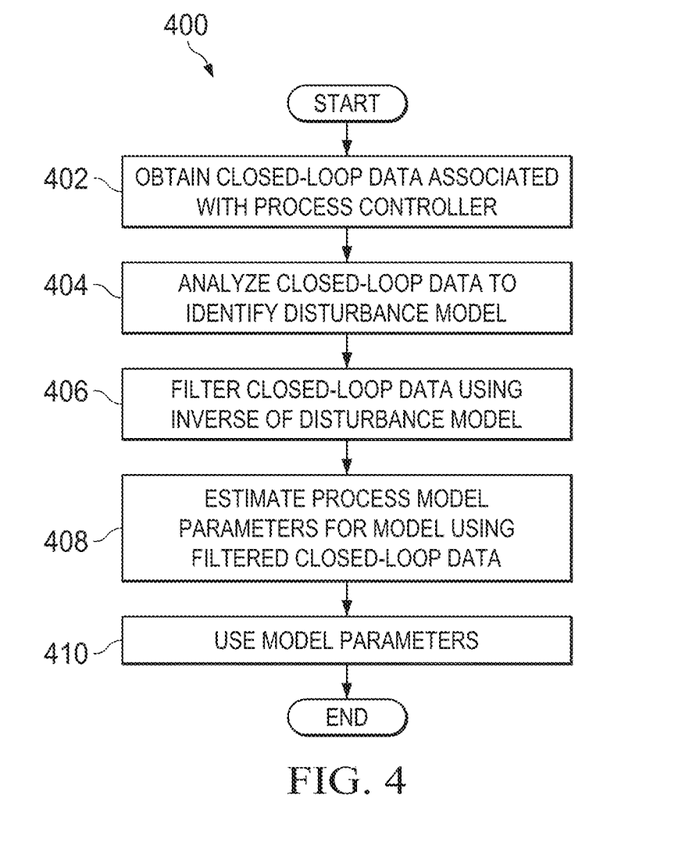
FIG. 4 illustrates an example method for closed-loop model parameter identification for industrial model-based process controllers according to this disclosure.

FIG. 4 illustrates an example method 400 for closed-loop model parameter identification for industrial model-based process controllers according to this disclosure. For ease of explanation, the method 400 is described below as being implemented using the device 300 of FIG. 3 in the systems 100, 200 of FIGS. 1 and 2. However, the method 400 could be performed using any suitable device and in any suitable system.

As shown in FIG. 4, closed-loop data associated with a model-based industrial process controller is obtained at step 402. This could include, for example, the processing device 302 that executes the tool 146, 232 obtaining data associated with operation of a model-based controller (such as a controller 106 or 204) from that controller or from another device. If the tool 146, 232 is executed within the controller 106 or 204, this could include the processing device 302 collecting the data during execution of control logic by the process controller. The collected data can include routine operating data that is generated as the process controller executes its control logic and attempts to control at least one industrial process (or portion thereof), such as controlled variable measurements and manipulated variable adjustments.

The closed-loop data is analyzed to identify at least one disturbance model at step 404. This could include, for example, the processing device 302 that executes the tool 146, 232 performing a model identification algorithm using the data. In particular embodiments, the tool 146, 232 implements a high-order autoregressive with exogenous terms (ARX) model identification algorithm that can fully capture the noise model dynamics without needing information about the true noise model. Part of the high-order ARX model identification algorithm can include identifying a noise model associated with noise related to the industrial process.

The closed-loop data is filtered using an inverse of the disturbance model at step 406. This could include, for example, the processing device 302 that executes the tool 146, 232 using an inverse of the previously-identified disturbance model to filter the closed-loop data.

Model parameter estimates for a process model are estimated using the filtered closed-loop data at step 408. This could include, for example, the processing device 302 that executes the tool 146, 232 performing a model identification algorithm using the filtered data, such as an output-error (OE) model identification algorithm or other model identification algorithm.

The model parameters are used in some manner at step 410. This could include, for example, the processing device 302 that executes the tool 146, 232 generating a new process model or updating an existing process model and providing the new or updated process model to a process controller. If the tool 146, 232 is executed within the controller 106 or 204, this could include the processing device 302 updating the process model used by control logic of the process controller.

In this way, the proposed techniques can reduce or eliminate bias that can occur in other identification methods, such as when a direct closed-loop identification method suffers from bias due to an insufficient specification of a noise model. Moreover, this approach can be applied to routine operating data in which external excitation may not exist and thus is suitable for continuous process model monitoring.

Although FIG. 4 illustrates one example of a method 400 for closed-loop model parameter identification for industrial model-based process controllers, various changes may be made to FIG. 4. For example, while shown as a series of steps, various steps in FIG. 4 could overlap, occur in parallel, occur in a different order, or occur any number of times.

Additional details regarding specific techniques for closed-loop process model identification are provided below. Note that the details provided below are examples only and that other implementations of the techniques described in this patent document could be used. Also note that while specific details are provided below (such as specific types of models or specific model identification algorithms), other implementations of the techniques described below could be used.

The following describes techniques for closed-loop process model identification with routine operating data, which can support functions such as process performance monitoring and model-plant mismatch detection. A noise model is estimated from a high-order ARX identification with closed-loop data, and an OE identification is performed on input-output data that has been filtered by the inverse of the estimated noise model. The proposed techniques can reduce or eliminate bias that occurs with a direct closed-loop identification method due to insufficient specification of the noise model. Moreover, the proposed techniques can be applied to routine operating data in which external excitation may not exist and thus are suitable for continuous process model monitoring. These techniques can give consistent estimates, and it can be shown that the parameter estimator is normally distributed asymptotically in the sample size. Among other things, these techniques help to overcome bias issues while preserving the techniques' versatility and simplicity in dealing with linear and nonlinear closed-loop data. An advantage of the proposed techniques is their applicability to situations with or without external excitations.

Initial Considerations

Consider the following single-input single-output (SISO) Box-Jenkins true system:

$$S: y(t) = G_0(q)u(t) + H_0(q)e(t) \tag{1}$$

where $y(t)$ and $u(t)$ denote the measured output signal (CV) and an input signal (MV), respectively. The true process model $G_0$ denotes a stable minimum-phase rational transfer function that is assumed to have at least one sample delay. The noise model $H_0$ denotes a monic, stable, and inversely-stable filter. The sequence $e(t)$ denotes independent and identically distributed Gaussian white noise with zero mean and variance $\sigma_e^2$.

In a closed loop, assume the input signal $u(t)$ can be determined by the following nonlinear mapping:

$$u(t) = k(t, u^{t-1}, y^{t-1}, r(t)) \tag{2}$$

where $u^{t-1} = [u(t-1), u(t-2), \ldots, u(1)]$ and $y^{t-1}$ is defined analogously. An external excitation signal $r(t)$ can be either a dither signal (normally added to an actuator site) or a setpoint signal. Note that Equation (2) is a general representation of a controller's behavior and covers both linear and nonlinear cases. A typical example of a nonlinear controller is an MPC controller with active constraints. From the perspective of system identification, the nonlinear controller shows an important benefit since it can increase the informativeness of the closed-loop data.

Assume that all relevant signals in Equations (1) and (2) are quasi-stationary, meaning the following conditions hold:

$$Es(t) = m(t), |m(t)| \leq C, \forall t \tag{3}$$

$$Es(t)s(t-\tau) = R_s(\tau), |R_s(\tau)| \leq C, \forall \tau \tag{4}$$

where $s(t)$ denotes a signal in Equations (1) and (2), C denotes a constant, and E denotes a conventional expectation operator for random variables. A generalized expectation operator $\bar{E}$ that could be applicable to signals having both stochastic and deterministic components can be expressed as:

$$\bar{E}s(t) = \lim_{N \to \infty} \frac{1}{N} \sum_{t=1}^{N} Es(t) \tag{5}$$

Also, define:

$$Z^N = \{u(1), y(1), \ldots, u(N), y(N)\} \tag{6}$$

to be a collection of sampled closed-loop data. To facilitate derivations, the following assumption is used by default unless otherwise explicitly stated. The collected closed-loop input-output data $Z_N$ is informative enough for the selected model structures in the relevant closed-loop identification. When external excitation exists, this assumption could be guaranteed by imposing the external excitation signal r(t) to be persistently exciting. For cases without external excitation, assume that the controller is complex enough to make this assumption hold. Note that for the derivations below, assume that r(t) exists, but note that the results without external excitations can be easily derived by setting r(t)=0.

For the prediction error method (PEM), a class of model structures can be constructed to fit into this data set, parameterized by $\theta=[\rho^T \gamma^T]^T \in \Omega_\theta \subseteq \mathbb{R}^{n_\theta}$, such that:

$$M: y(t) = G(q,\rho)u(t) + H(q,\gamma)e(t) \quad (7)$$

where $\rho \in \Omega_\rho \subseteq \mathbb{R}^{n_\rho}$ and $\gamma \in \Omega_\gamma \subseteq \mathbb{R}^{n_\gamma}$ are the parameter vectors of the process model and the noise model, respectively. Define $Q_\theta$, $Q_\rho$, and $Q_\gamma$ to be the corresponding compact sets of parameters $\theta$, $\rho$, and $\gamma$. Further suppose that the selected model structures $G(q, \rho)$ and $H(q, \gamma)$ are uniformly stable with respect to the parameter $\theta$ and that $H(q, \gamma)$ is also inversely uniformly stable. Note that $G_\rho$, $G_\rho(q)$, and $G(q, \rho)$ are used interchangeably if there is no risk of confusion.

It can be assumed that the true process model is contained in the set of the selected process model structures, meaning:

$$G_0 \in \hat{G} = \{G(q,\rho) | \rho \in \Omega_\rho\} \quad (8)$$

Also, assume that all relevant closed-loop transfer functions formed by the selected family of model structures are uniformly stable under the controller in Equation (2). This condition also guarantees closed-loop stability of the true system since the true system is contained in the selected model structures. This assumption is valid from a practical point of view since, for most industrial processes, a priori knowledge of the process is often available.

It is well-known that if the selected noise structure also contains the true noise model, the direct identification method provides consistent estimates for both the process and noise model parameters, regardless of whether the experiment is closed-loop or open-loop. However, this statement is too stringent to hold in practice since the characteristics of the noise are generally too complex to analyze or to identify an appropriate model structure. Thus, discrepancies between the true noise model and the selected noise model structure are inevitable. Moreover, for process control engineers or other personnel, the reliability of the identified process model is often more important than the reliability of the noise model for controller design.

A direct consequence of this noise model mismatch is a biased estimate of the process model if the PEM is applied to closed-loop data. To be more specific, taking a fixed noise model H*(q) as an instance, the process model parameter estimate can be expressed as:

$$\rho^* = \arg\min_{\rho \in \Omega_\rho} \frac{1}{2\pi} \int_{-\pi}^{\pi} \frac{|G_0(e^{j\omega}) + B(e^{j\omega}) - G_\rho e^{j\omega}|^2 \Phi_u(\omega)}{|H_*(e^{j\omega})|^2} d\omega \quad (9)$$

Here, $B(e^{j\omega})$ is the bias term and could be expressed as:

$$B(e^{j\omega}) = \frac{(H_0(e^{j\omega}) - H_\theta(e^{j\omega}))\Phi_{ue}(\omega)}{\Phi_u(\omega)} \quad (10)$$

where $\Phi_{ue}(\omega)$ denotes the cross-spectrum between the input and the noise. For open-loop data, $\Phi_{ue}(\omega)=0$. Thus, an OE structure with a fixed noise model can give an unbiased process model estimate. As described below, a two-step approach can therefore be used to resolve the bias issue while maintaining other advantages of the direct identification method.

Closed-Loop ARX-OE Identification

The following describes a particular implementation of a closed-loop model parameter identification technique based on ARX-OE identification. The proposed closed-loop identification technique includes two general steps, namely high-order ARX modeling followed by closed-loop OE identification using filtered input-output data.

First Step: High-Order ARX Modeling

Equation (1) above can be rewritten into an equivalent form as follows:

$$A_0(q)y(t) = B_0(q)u(t) + e(t) \quad (11)$$

where:

$$A_0(q) = \frac{1}{H_0(q)}, \quad (12)$$

$$B_0(q) = \frac{G_0(q)}{H_0(q)}$$

Since $H_0(q)$ is assumed to be inversely stable, $A_0(q)$ and $B_0(q)$ are also stable. In most cases, the impulse response (IR) coefficients of $A_0(q)$ and $B_0(q)$ contain infinite terms, meaning:

$$A_0(q) = 1 + \sum_{k=1}^{\infty} a_k^0 q^{-k}, \quad (13)$$

$$B_0(q) = \sum_{k=1}^{\infty} b_k^0 q^{-k}$$

Thus, the original Box-Jenkins model can be represented by an ARX model but with an infinite number of parameters. A high-order ARX model can therefore be used to fit into the closed-loop data as follows:

$$A(q,\eta_n)y(t) = B(q,\eta_n)u(t) + e(t) \quad (14)$$

Here, n is the selected order, and $$A(q, \eta_n) = 1 + \sum_{k=1}^{n} a_k q^{-k}, \quad (15)$$

$$B(q, \eta_n) = \sum_{k=1}^{n} b_k q^{-k}$$

with:

$$\eta_n = [a_1, \ldots, a_n, b_1, \ldots, b_n]^T \quad (16)$$

The IR coefficients may converge to zero after sufficient lags, and the high-order ARX model can capture the first few significant coefficients. For example, based on Equations (14) and (15), the parameter estimates of the ARX model can be readily achieved by solving a least-squares problem. The estimates of the parameters could be defined as:

$$\hat{\eta}_n = [\hat{a}_1, \ldots, \hat{a}_n, \hat{b}_1, \ldots, \hat{b}_n]^T \quad (17)$$

It is evident that the parameter estimates $\hat{\eta}_n$ under Equations (14) and (15) can suffer from large variance, such as due to the large number of parameters. One remedy for this issue is to add regularization to the least-squares problem. It has been shown that a regularized regressor converges to a true regressor (with probability 1) as the sample number tends to infinity. Moreover, the IR coefficients of most practical noise models tend to decay very quickly, and a priori information can be used to choose a reasonable model order for the ARX identification in the first step.

For theoretical convenience, assume that (as the sample size N tends to infinity) the order of the selected ARX structure is allowed to tend to infinity but with a much slower increase rate than N. For the high-order ARX model in Equation (14), it holds that:

$$n(N) \to \infty, n(N)^{3+\delta}/N = \infty, \text{ as } N \to \infty \qquad (18)$$

where $\delta > 0$ is a constant. With this assumption, denote:

$$\hat{\eta}_N = \hat{\eta}_{n(N)} \qquad (19)$$

to represent the estimates of the parameters in $\eta_n$ when n is allowed to tend to infinity as a function of N. Also, define $\eta_0$ as a vector stacking the infinite number of true parameters in the high-order ARX model, meaning:

$$\eta_0 = [a_1^0, \ldots, a_n^0, b_1^0, \ldots, b_n^0, \ldots]^T \qquad (20)$$

In the following discussion, $A_0(q)$ and $A(q, \eta_0)$ are used interchangeably, as are $B_0(q)$ and $B(q, \eta_0)$.

Note that, if the various assumptions described above hold, the following can be obtained:

$$\sup_{\omega} |A(e^{j\omega}, \hat{\eta}_N) - A_0(e^{j\omega})| \to 0, w \cdot p \cdot 1, \text{ as } N \to \infty \qquad (21)$$

Thus, asymptotically in both the sample number and the order of the ARX model, the estimate $A(q, \hat{\eta}_N)$ of $A_0(q)$ converges almost surely to the true value. Notice that this holds regardless of whether the data is open-loop or closed-loop, as long as the corresponding assumptions can be satisfied.

Second Step: OE Modeling with Filtered Input-Output Data

In the second step of the proposed approach, OE model identification is performed using filtered input and output signals. The filter can be chosen as the estimated $A(q,\hat{\eta}_N)$ from the first step. For ease of notation, the operation of filtering a signal s(t) using $A(q,\hat{\eta}_N)$ can be defined as:

$$s(t,\hat{\eta}_N) = A(q,\hat{\eta}_N)s(t) \qquad (22)$$

to show this explicit dependence. With this notation, the filtered input and output signals can be expressed as follows:

$$y(t,\hat{\eta}_N) = A(q,\hat{\eta}_N)y(t), u(t,\hat{\eta}_N) = A(q,\hat{\eta}_N)u(t) \qquad (23)$$

To estimate the process model, fit the following OE model to the filtered input-output data:

$$y(t,\hat{\eta}_N) = G(q,\rho)u(t,\hat{\eta}_N) + e(t), \rho \in \Omega_\rho \qquad (24)$$

where a priori information related to the process model can be imposed, such as by using a first-order plus time-delay model for a paper machine. The one-step-ahead predictor of the above OE model can be expressed as:

$$\hat{y}(t|t-1,\rho,\hat{\eta}_N) = G(q,\rho)u(t,\hat{\eta}_N) \qquad (25)$$

The resulting prediction error can be expressed as:

$$\varepsilon(t, \rho, \hat{\eta}_N) = \qquad (26)$$
$$y(t) - \hat{y}(t | t-1, \hat{\eta}_N) = [G_0 - G(q, \rho)]u(t, \hat{\eta}_N) + \frac{A(q, \hat{\eta}_N)}{A_0(q)}e(t)$$

For the prediction error method, the optimal parameter can be obtained by minimizing the following objective function:

$$\hat{\rho}_N = \arg\min_{\rho \in \Omega_\rho} V_N(\rho, \hat{\eta}_N) = \frac{1}{N}\sum_{t=1}^{N}\frac{1}{2}\varepsilon^2(t, \rho, \hat{\eta}_N) \qquad (27)$$

Solving the OE model identification in Equations (26) and (27) often involves nonconvex optimization, so the global minima in general may not be guaranteed. Global minimum searching algorithms are not developed in this document, but for details on this topic see Zhu et al., "The Box-Jenkins Steiglitz-McBride algorithm," Automatica 65 (2016), pp. 170-182 (which is hereby incorporated by reference in its entirety).

In practice, proper selection of the ARX model could involve trial and error or could be based on apriori knowledge of a process. Also, it can be shown through asymptotic analysis that the estimate of the process model determined using the described ARX-OE technique approaches the true model as the sample size N tends to infinity. Based on that, a sufficiently high order is adequate to give high-quality estimates of a noise model. The regularization added to the least-squares problem helps to improve the accuracy of the parameter estimates.

Note that many online process monitoring tasks, such as model-plant mismatch detection for MPC, may involve closed-loop identification that is performed based on routine operating data (where external excitation signals may not exist). It is well-known that, if there is no external excitation, closed-loop identification using the prediction error method could result in an estimate of the inverse of the controller. This is because of the possibility of relating input-output data through feedback instead of through process and noise models. In particular, when r(t)=0, the output and input signals could be equivalent to:

$$y(t) = G_0(q)u(t) + H_0(q)e(t) \qquad (28)$$

$$u(t) = -K(q)y(t) \qquad (29)$$

The fitting error of estimating $G_0$ is larger than zero, while the fitting error of estimating $-1/K(q)$ between y(t) and u(t) is zero. Thus, the PEM takes the controller inverse as the estimate of the process since the corresponding prediction error is the minimum. One solution to this issue is imposing a time delay on the identification method, where a longer time delay will help prevent estimating the inverse of the controller. A number of delay estimation approaches using closed-loop data are available. Examples are described in Björklund et al., "A review of time-delay estimation techniques," Proceedings of the 42nd IEEE Conference on Decision and Control, vol. 3, 2003, pp. 2502-2507 and Babji et al., "Time-delay estimation in closed-loop processes using average mutual information theory," Control & Intelligent Systems, vol. 37(3), 2009, pp. 176-182 (both of which are hereby incorporated by reference in their entirety). Time-delay estimation could occur before performing the closed-loop ARX-OE identification technique.

It has also been discovered that closed-loop data without external excitation may still contain certain excitations, such as excitations determined by the complexity of the feedback controller. The specific relationships between the order of the regulator and that of the process model have been investigated, and it has been concluded that a more complicated controller and a large time-delay enrich the informativeness of the closed-loop data. Thus, nonlinear dynamics of a controller can be favored from this perspective. Fortunately, for many industrial processes controlled by MPC (such as paper machines), routine data is generally sufficiently exciting to apply the ARX-OE identification technique, especially when the MPC operates with active constraints. The regularization in the first step of high-order ARX modeling can also guarantee its safety in case of less informative data.

In addition, it is well-known that, for closed-loop identification methods that use external excitation signals, noise has a negative effect on parameter covariance. For the direct identification method, it has been argued that such noise is favored since it can reduce the variance. This argument also applies here since system identification based on routine operating data that may lack external excitation is being performed. Moreover, from the perspective of identifiability, larger noise variance may be desirable or preferred here since it may activate more MPC constraints and thus increase the order of persistent excitation of the closed-loop data.

Summary

This disclosure has described novel closed-loop identification techniques that can correct bias inherent in direct identification methods due to insufficient specification of a noise model. A high-order ARX or other model is identified to obtain an estimate of the noise model. The input and output data is filtered using an inverse of the estimated noise model, and an OE model identification or other model identification occurs with the filtered input-output data to obtain a process model estimate. It can be shown that this closed-loop ARX-OE identification approach can give consistent estimates and that the parameter estimator is asymptotically normally distributed. These techniques are applicable in various situations, including those where a controller is nonlinear and those where closed-loop data contains no external excitations. Therefore, these techniques exhibit great potential for functions such as controller performance monitoring and model-plant mismatch detection that involve process model identification based on routine operating data.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
    obtaining closed-loop data associated with operation of an industrial process controller, the industrial process controller configured to control at least part of an industrial process using at least one model;
    generating at least one noise model using a first model identification process associated with the industrial process controller using at least some of the closed-loop data, the first model identification process comprising a high-order autoregressive with exogenous terms (ARX) model identification process;
    filtering the closed-loop data based on the at least one noise model, wherein the filter chosen is an estimation based on the generated at least one noise model is defined as:

$$s(t,\hat{\eta}_N) = A(q,\hat{\eta}_N)s(t);$$

wherein s(t) are the signals to be filtered, A(q) the ARX model and $\hat{\eta}_N$ represents estimates of model parameters; and generating one or more model parameters for the industrial process controller using the filtered closed-loop data, wherein generating the one or more model parameters comprises performing a second model identification process comprising an output-error (OE) model identification process.

2. The method of claim 1, wherein filtering the closed-loop data comprises using an inverse of the at least one noise model.

3. The method of claim 1, further comprising at least one of:
updating the at least one model using the one or more model parameters; and
generating at least one second model using the one or more model parameters.

4. The method of claim 3, further comprising providing the at least one updated model or the at least one second model to the industrial process controller.

5. The method of claim 1, wherein generating the at least one noise model comprises solving a least-squares problem having added regularization.

6. An apparatus comprising:
at least one memory configured to store closed-loop data associated with operation of an industrial process controller that is configured to control at least part of an industrial process using at least one model; and
at least one processing device configured to:
generate at least one noise model using a first model identification process associated with the industrial process controller using at least some of the closed-loop data, the first model identification process comprising a high-order autoregressive with exogenous terms (ARX) model identification process;
filter the closed-loop data based on the at least one noise model, wherein the filter chosen is an estimation based on the generated at least one noise model is defined as:

$$s(t,\hat{\eta}_N)=A(q,\hat{\eta}_N)s(t);$$

wherein s(t) are the signals to be filtered, A(q) the ARX model and $\hat{\eta}_N$ represents estimates of model parameters; and
generate one or more model parameters for the industrial process controller using the filtered closed-loop data, wherein generating the one or more model parameters comprises performing a second model identification process comprising an output-error (OE) model identification process.

7. The apparatus of claim 6, wherein the at least one processing device is configured to use an inverse of the at least one noise model to filter the closed-loop data.

8. The apparatus of claim 6, wherein the at least one processing device is further configured to at least one of:
update the at least one model using the one or more model parameters; and
generate at least one second model using the one or more model parameters.

9. The apparatus of claim 8, wherein the at least one processing device is further configured to provide the at least one updated model or the at least one second model to the industrial process controller.

10. The apparatus of claim 6, wherein the at least one processing device is configured to solve a least-squares problem having added regularization to generate the at least one noise model.

11. A non-transitory computer readable medium containing instructions that, when executed by at least one processing device, cause the at least one processing device to:
obtain closed-loop data associated with operation of an industrial process controller, the industrial process controller configured to control at least part of an industrial process using at least one model;
generate at least one noise model using a first model identification process associated with the industrial process controller using at least some of the closed-loop data, the first model identification process comprising a high-order autoregressive with exogenous terms (ARX) model identification process;
filter the closed-loop data based on the at least one noise model, wherein the filter chosen is an estimation based on the generated at least one noise model is defined as:

$$s(t,\hat{\eta}_N)=A(q,\hat{\eta}_N)s(t);$$

wherein s(t) are the signals to be filtered, A(q) the ARX model and $\hat{\eta}_N$ represents estimates of model parameters; and
generate one or more model parameters for the industrial process controller using the filtered closed-loop data, wherein generating the one or more model parameters comprises performing a second model identification process comprising an output-error (OE) model identification process.

12. The non-transitory computer readable medium of claim 11, wherein the instructions that when executed cause the at least one processing device to filter the closed-loop data comprise:
instructions that when executed cause the at least one processing device to filter the closed-loop data using an inverse of the at least one noise model.

13. The non-transitory computer readable medium of claim 11, further containing instructions that when executed cause the at least one processing device to at least one of:
update the at least one model using the one or more model parameters; and
generate at least one second model using the one or more model parameters.

14. The non-transitory computer readable medium of claim 11, wherein the instructions that when executed cause the at least one processing device to generate the at least one noise model comprise:
instructions that when executed cause the at least one processing device to solve a least-squares problem having added regularization.

* * * * *